UNITED STATES PATENT OFFICE.

AUGUST LEOPOLD LASKA, OF OFFENBACH-ON-THE-MAIN, GERMANY, ASSIGNOR TO CHEMISCHE FABRIK GRIESHEIM-ELEKTRON, OF FRANKFORT-ON-THE-MAIN, GERMANY, A CORPORATION.

YELLOW MONOAZO DYE AND PROCESS OF MAKING SAME.

No. 849,739.  Specification of Letters Patent.  Patented April 9, 1907.

Application filed November 6, 1906. Serial No. 342,173.

*To all whom it may concern:*

Be it known that I, AUGUST LEOPOLD LASKA, doctor of philosophy, chemist, and a resident of 5 Gerberstrasse, Offenbach-on-the-Main, in the Grand Duchy of Hesse, Germany, have invented new and useful Improvements in Yellow Monoazo Dyestuffs, of which the following is a specification.

My invention relates to the production of yellow wool dyestuffs by combining the chlorin derivatives of the orthoanilin-sulfonic acid with pyrazolon derivatives of the general formula:

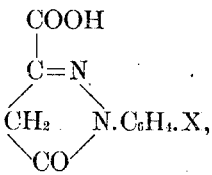

wherein X means a hydrogen atom or a sulfo group. The dyestuffs thus obtained dye wool yellow tints of excellent fastness to light. They also are very apt for the production of pigment colors.

The following example will serve to illustrate my invention. The parts are by weight.

Example: 48.4 parts of 3:4 dichloranilin-sulfonic acid ($Cl.Cl.NH_2.SO_3H = 1:2:4:5$) and 11.3 parts of calcined sodium carbonate are dissolved in one hundred and fifty parts of water. The solution is cooled down to 15° centigrade by addition of ice and diazotized by means of fifty-seven parts of hydrochloric acid 20° Baumé and 13.8 parts of sodium nitrite. The diazo solution is then poured into an ice-cold solution of 56.8 parts of 1-para-sulfophenyl-5-pyrazolon-3-carbonic acid in about five hundred parts of water and the sufficient quantity of sodium carbonate. After the formation of the dyestuff is completed the mixture is heated up to 70° centigrade and the dyestuff precipitated by acidifying and addition of common salt, filtered, pressed, and dried in the usual manner. The combinations with other diazo compounds and with the 1-phenyl-5-pyrazolon-3-carbonic acid may be carried out in the same manner.

The following table will give some of the properties of the azo coloring-matters obtained according to my invention:

| Dyestuff prepared by combination of diazotized— | With— | Dyes wool from acid-bath— |
|---|---|---|
| P. Chloranilin-orthosulfonic acid | Sulfophenylpyrazolon-carbonic acid | Lemon yellow. |
| Chloranilin-orthosulfonic acid | Phenylpyrazolon carbonic acid | Yellow. |
| Chloranilinsulfonic acid  | Sulfophenylpyrazolon-carbonic acid | Yellow. |
| Chloranilinsulfonic acid 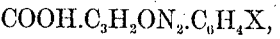 | Phenylpyrazolon carbonic acid | Yellow. |
| Dichloranilin sulfonic acid Cl Cl NH₂ SO₃H 1 2 4 5 | Sulfophenylpyrazolon-carbonic acid | Yellow. |
| Dichloranilin sulfonic acid Cl Cl NH₂ SO₃H 1 2 4 5 | Phenylpyrazolon carbonic acid | Reddish yellow. |

The color-lakes obtained from these dyestuffs are of excellent fastness to light and water.

Now what I claim, and desire to secure by Letters Patent, is the following:

1. The process of manufacturing yellow monoazo dyestuffs, which consists in combining the diazotized chlorin derivatives of the orthoanilin-sulfonic acid with pyrazolon derivatives of the general formula:

$$COOH.C_3H_2ON_2.C_6H_4X,$$

wherein X means a hydrogen atom or a sulfo group.

2. As a new article of manufacture the dyestuffs obtained by combining the diazotized chlorin derivatives of the orthoanilin-sulfonic acid with pyrazolon derivatives of the general formula:

$$COOH.C_3H_2ON_2.C_6H_4X,$$

wherein X means a hydrogen atom or a sulfo group, forming orange-powders, soluble in concentrated sulfuric acid to an orange solution, in water to a yellow one, being hardly altered by addition of caustic-soda lye or hydrochloric acid.

In testimony that I claim the foregoing as my invention I have signed my name, in presence of two witnesses, this 23d day of October, 1906.

AUGUST LEOPOLD LASKA.

Witnesses:
 EVA SATTLER,
 USKUS STAUDHARDT.